United States Patent
Van Den Herik et al.

(10) Patent No.: US 9,654,693 B2
(45) Date of Patent: May 16, 2017

(54) DEGRADATION CONTROL OF DISPLAY PIXELS FOR A HIGH DEFINITION DISPLAY

(71) Applicant: GVBB HOLDINGS S.A.R.L., Luxembourg (LU)

(72) Inventors: Ben Van Den Herik, Grass Valley, CA (US); Martin de Boer, Grass Valley, CA (US)

(73) Assignee: GVBB HOLDINGS S.A.R.L., Luxembourg (LU)

(*) Notice: Subject to any disclaimer, the term of this patent is extended or adjusted under 35 U.S.C. 154(b) by 157 days.

(21) Appl. No.: 14/526,924

(22) Filed: Oct. 29, 2014

(65) Prior Publication Data

US 2016/0127650 A1    May 5, 2016

(51) Int. Cl.
*H04N 5/232* (2006.01)
*G09G 3/20* (2006.01)
*G09G 5/10* (2006.01)

(52) U.S. Cl.
CPC ........... *H04N 5/23293* (2013.01); *G09G 3/20* (2013.01); *G09G 5/10* (2013.01); *G09G 2320/0233* (2013.01); *G09G 2320/046* (2013.01)

(58) Field of Classification Search
CPC ........ H04N 5/23293; G09G 3/20; G09G 5/10; G09G 2320/046; G09G 2320/0233
See application file for complete search history.

(56) References Cited

U.S. PATENT DOCUMENTS

| 2002/0018600 A1* | 2/2002 | Lyon | H04N 3/155 382/305 |
| 2006/0209054 A1* | 9/2006 | Someya | G09G 3/007 345/204 |
| 2007/0909284 | 5/2007 | Shunpei et al. | |
| 2012/0075438 A1* | 3/2012 | Kikkawa | G09G 3/003 348/54 |
| 2014/0119651 A1* | 5/2014 | Meyers | G06T 5/50 382/167 |
| 2015/0187277 A1 | 7/2015 | Maeyama et al. | |

FOREIGN PATENT DOCUMENTS

| EP | 1814098 A1 | 8/2007 |
| EP | 1819154 A2 | 8/2007 |
| WO | 2010140430 A1 | 12/2010 |
| WO | 2014015982 A1 | 1/2014 |

OTHER PUBLICATIONS

International Search Report and Written Opinion dated Jan. 20, 2016, regarding PCT/EP2015/075184.

* cited by examiner

*Primary Examiner* — Mekonnen Dagnew
(74) *Attorney, Agent, or Firm* — Arent Fox LLP

(57) ABSTRACT

An apparatus includes a display and an image processing system. The display has an array of horizontal pixels and vertical pixels. The image processing system is configured to present an image on the display as a visible display array having a smaller size than the array and to shift the visible display array by at least one pixel.

14 Claims, 5 Drawing Sheets

000000
DEGRADATION CONTROL OF DISPLAY PIXELS FOR A HIGH DEFINITION DISPLAY

BACKGROUND

Field

The present disclosure relates generally to self-emitting high definition (HD) displays, and more particularly, to pixel control of the displays.

Background

High definition (HD) displays are used in a variety of applications, including televisions, personal computers and tablets, smart phones, and camera viewfinders. Some forms of HD display technology include liquid crystal display (LCD), plasma, light emitting diode (LED) and organic LED (OLED). The HD display screen is formed by an array of pixels, where each pixel typically includes three color elements, blue, green, and red. Backlit displays, such as LCD, experience a homogenous degradation in luminance with progression of service duty. In self-emitting displays, such as plasma, LED, and OLED, a degradation in pixel output is known to occur as the pixels are energized over time and the various color elements accumulate a service duty. The pixel degradation for self-emitting displays is thus manifested by a drop in luminance for the particular color element. Consequently, certain colors of the self-emitting display may become noticeably dimmer over time. Moreover, the blue, green and red elements do not degrade at an even rate, resulting in a color shift away from the weaker color. For example, the blue elements may degrade at a faster rate, resulting in the display having weaker blue hues, and more prominent red and green overall.

Pixel degradation can be accelerated when an overlay is consistently present on the display. Take for instance a cross hair indicator digitally superimposed on a camera viewfinder to assist the user in centering a subject for video capture. Should the overlay remain in a fixed position for an extended period and remain the same color, it follows that the pixels energized to form the overlay will experience an accelerated degradation for the particular color element employed.

SUMMARY

In an aspect of the disclosure, an apparatus for shifting a video image across a display by one or more pixels horizontally and vertically is provided, thus extending the lifetime of pixels used to display a fixed overlay and retarding the degradation of the pixels.

In another aspect of the disclosure, an apparatus includes a display having an array of horizontal pixels and vertical pixels and an image processing system configured to present an image on the display as a visible display array having a smaller size than the array; and to shift the visible display array by at least one pixel.

In another aspect of the disclosure, a camera includes an imager configured to convert photons to an electrical image signal; and a viewfinder including a display having an array of horizontal pixels and vertical pixels; and an image processing system configured to present an image on the display based on the electrical image signal as a visible display array having a smaller size than the array; and to shift the visible display array by at least one pixel.

DETAILED DESCRIPTION

Figure 1:
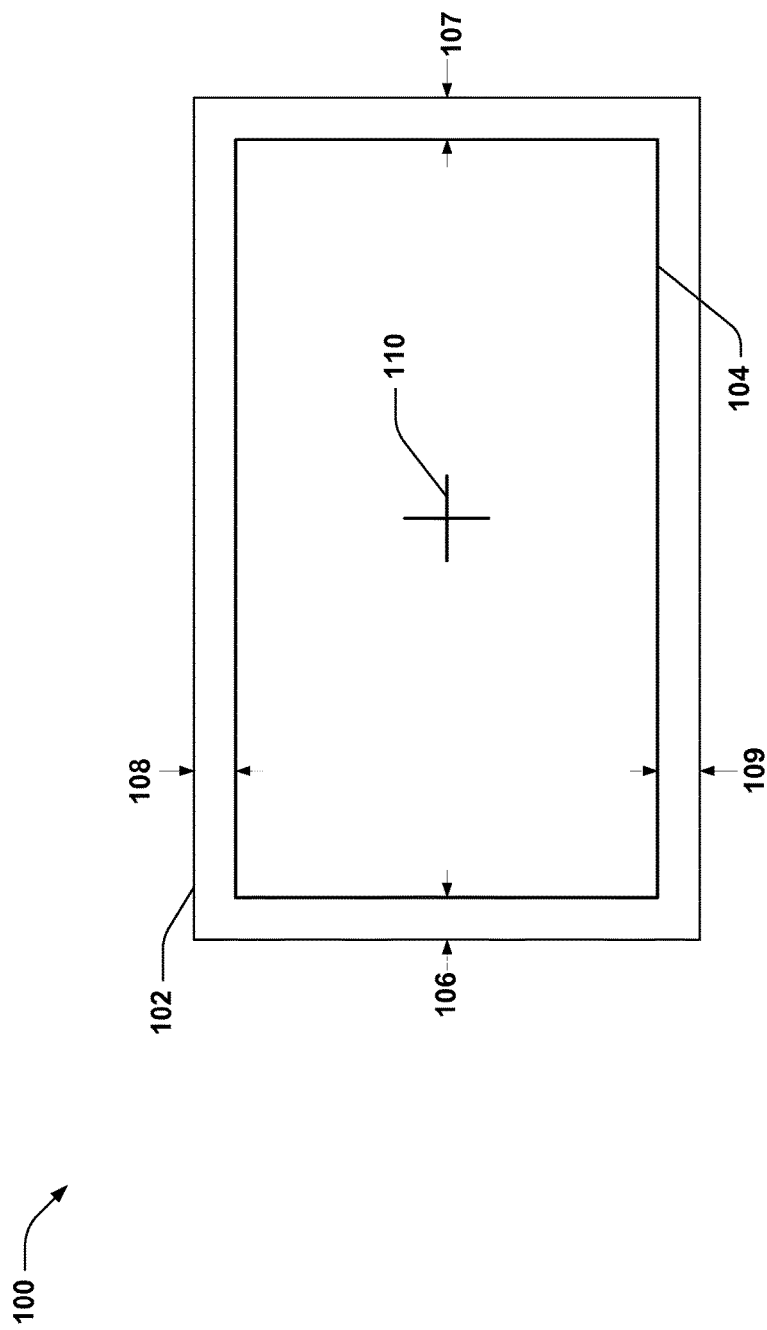
FIG. 1 illustrates an example of a display having a reduced visual display region of pixels to accommodate pixel array shifting.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with an "image processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. The image processing system may also be implemented on a processing device that includes any one or more of the above processors. One or more processors in the image processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, non-transitory storage such as a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, as well as a carrier wave, a transmission line, and any other suitable medium for storing or transmitting software. The computer-readable medium may be resident in the image processing system, external to the image processing system, or distributed across multiple entities including the image processing system. Those skilled in the art will recognize how best to implement the described functionality presented throughout this disclosure depending on the particular application and the overall design constraints imposed on the overall system.

Certain embodiments of the described invention provide an adaptable viewfinder that may be used to display video images having a broad range of formats and/or resolutions. A pixel control means may be provided within the viewfinder for retarding pixel degradation caused by fixed overlays. A pixel control means may be provided within the viewfinder for compensation of pixel degradation caused by fixed overlays.

FIG. 1 illustrates a video display arrangement 100 that has a full field of pixels 102, such as 1920 horizontal lines and 1080 vertical lines of pixels, for example. In this aspect, a visible field 104 is defined that is smaller than the full field 102, reduced according to (1920-n) horizontal lines and (1080-m) vertical lines of pixels, where n≥1 and m≥1. As shown in FIG. 1, reserved horizontal regions 106 and 107 are each n/2 pixels wide, and reserved vertical regions 108 and 109 are each m/2 pixels long. Alternatively, visible field 104 may be positioned such that a reserved horizontal region 106 of n pixels exists, and region 107 is 0 pixels wide, or vice-versa. In another alternative example, the reserved vertical region 108 may be m pixels wide, while reserved vertical region 109 is 0 pixels wide. In another alternative example, the visible field 104 may be positioned such that an asymmetrical number of pixels exist in regions 106 and 107, and/or in regions 108 and 109. The pixels within the reserved regions 106-109 may be in a de-energized standby state. An example overlay 110 is shown, which may be used as a centered cross mark for guiding the camera user to the center of view during recording. Other indicators may be overlaid in the field either in the alternative or in combination with the overlay 110 as shown. In this aspect, the visual field 104 may be shifted horizontally by N pixels for the range (1≤N≤n) and/or shifted vertically by M pixels for the range (1≤M≤m), which then activates the reserved pixels previously in a standby state, as needed. For example, a shift of the visible field 104 into the reserved horizontal region 106 for N=1 pixel will trigger the first adjacent pixel in each horizontal row along the reserved region 106 to display the shifted image. Meanwhile, the first adjacent pixel in each horizontal row of buffer region 107 may become inactive and placed in a standby state until a subsequent shift of the visible field 104 returns back to within the reserved region 107. In a similar manner, the visible field 104 may be shifted vertically, using the reserved regions 108 and 109. As the pixel field 104 is shifted, the pixels of overlay 110 are also shifted in unison. Accordingly, the pixels used to display the overlay 110 are not permanently fixed, and there are several pixels used over time for displaying each point on the overlay 110.

As an example of an orbiting pattern for the pixel array, TABLE 1 below shows available coordinates for one particular pixel initially located at a23 as the shifting pattern is executed.

TABLE 1

| a11 | a12 | a13 | a14 | a15 |
| a21 | a22 | a23 | a24 | a25 |
| a31 | a32 | a33 | a34 | a35 |
| a41 | a42 | a43 | a44 | a45 |

From a23, an example orbiting pattern may commence according to the following sequence of coordinates: a23, a24, a34, a33, a32, a22, a12, a11, a21, a31, a41, a42, a43, a44, a45, a35, a25, a15, a14, a13, and returning to the starting position a23. The interval between each shift may be equal for a linear distribution. Alternatively, the interval may be uneven according to a nonlinear distribution. The distribution may also alternate between linear and nonlinear.

Figure 2:
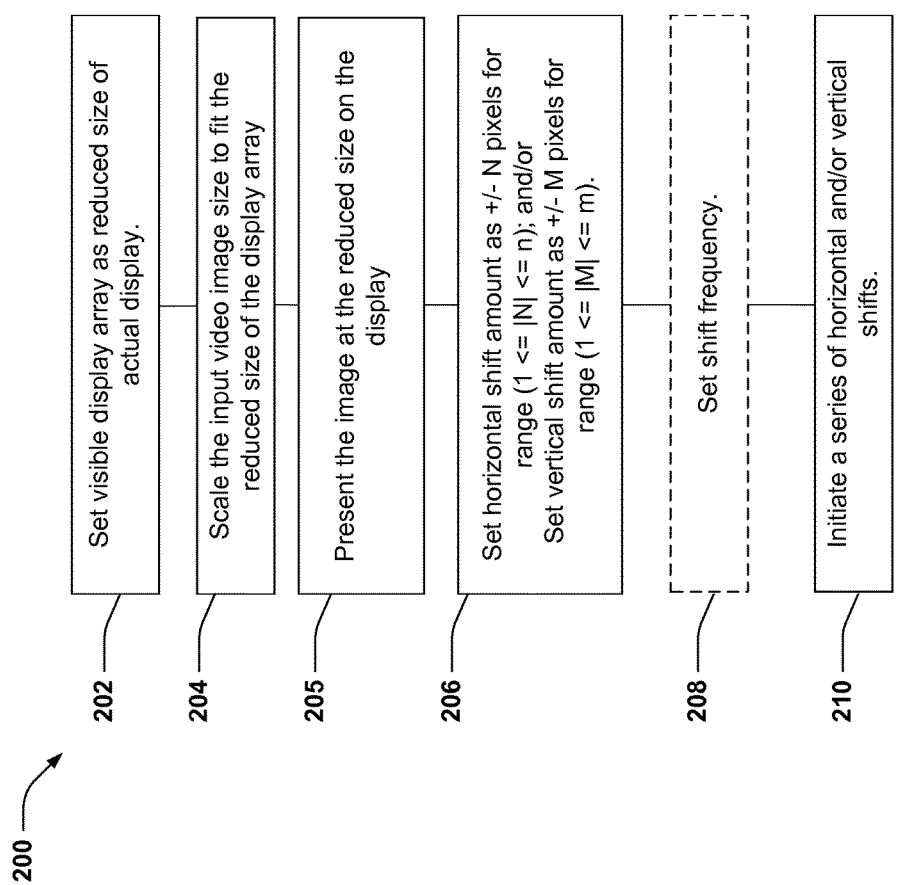
FIG. 2 is a flow chart of an example method for scaling and shifting the pixel array of visual display region.

FIG. 2 is a flow chart that shows a method 200 in accordance with an aspect of the invention. In 202, the visible display array is set as a reduced size of the available horizontal pixels H and vertical pixels V. Accordingly, the visible display array may be defined as (H-n) horizontal pixels and (V-m) vertical pixels, creating n reserved pixels in each horizontal row, and m reserved pixels in each vertical column. In 204, the input video image size is scaled to fit the defined visible display array. In 205, the image is presented to the display at the reduced size to accommodate shifting of the visual display array. In 206, the horizontal shift amount is set at [0, +/−N] pixels for the range (0≤|N|≤n), and a vertical shift amount is set at [0, +/−M] pixels for the range (0≤|M|≤m). In optional step 208, a shift frequency is set, which may be fixed within a range of one shift per 1 to 60 minutes for example. For instance, if a shift frequency is set to one shift per hour, then a horizontal or vertical shift occurs in intervals of 60 minutes. Alternatively, the range may be fixed within a range of 1 to 24 hours. Alternatively, the frequency may be variable over time. In 210, a series of horizontal and/or vertical shifts are initiated to distribute the overlay across a set of pixels to avoid a permanently fixed overlay. Each shift within the series of shifts may occur infrequently such that it is essentially imperceptible to the camera user. The series of shifts may include horizontal shifts only, or vertical shifts only, or a combination of horizontal and vertical shifts. The shifting pattern may be achieved by applying a Gaussian filter to maintain a Gaussian distribution of the pixel array. By shifting according to a Gaussian distribution, the line of pixels that form the overlay may have a blurred transition rather than a high contrast transition against the adjacent field of pixels over the course of time, as pixel degradation at the lines does not occur at fixed lines. Alternatively, other distributions may be applied to the horizontal and vertical shifts to assure that the overlay pixels are distributed over a range (0:n, 0:m).

Figure 3:
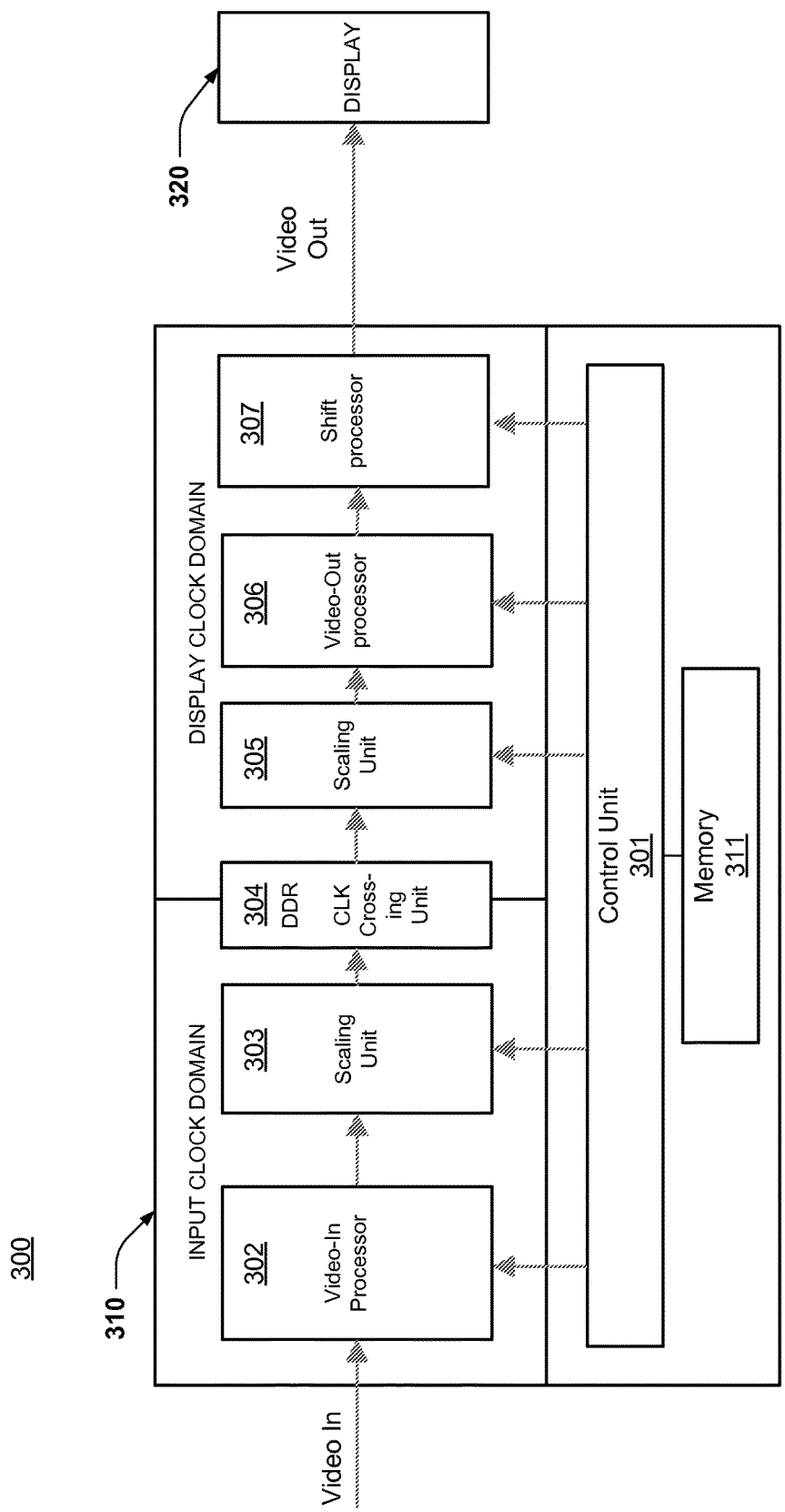
FIG. 3 shows diagram of an exemplary apparatus for scaling and shifting the pixel array on a display.

FIG. 3 is a block diagram of an example apparatus 300, which includes a display 320 and an image processing system 310 configured to perform the scaling and shifting of the pixel array of method 200. The display 320 may be, for example, a LCD, LED or OLED display screen resident in the image processing system, external to the image processing system, or distributed across multiple entities including the image processing system. The display 320 may be a high definition (HD) self-lit display screen. The image processing system 310 may be configured to perform as a multi-purpose scaler capable of scaling up or down as needed for SD and HD formats. The image processing system 310 includes a video-in processing unit 302 and a scaling unit 303 that may process the video in signal in an input clock domain. A video-in processing unit 302 includes circuitry and/or software modules to perform functions such as video generation, color control and a focus assist. A scaling unit 303 is configured to scale the camera video signal to a proper format in the input clock domain. The scaling unit 303 may include an upscaling unit and/or a downscaling unit to scale the camera video signal by a scale factor, which may be an integer or may be a fraction. The scaling unit 303 may be configured to perform at least one of an upscaling of horizontal pixels, an upscaling of vertical pixels, a downscaling of horizontal pixels or a downscaling of vertical pixels. For example, if the video source is 3960 horizontal pixels and the display is 1980 horizontal pixels, the scaling unit 303 may down scale the data samples by ½. The scaling factor may also include the value n to account for reserved pixels in the horizontal row in regions 106, 107 as shown in FIG. 1. For example, using the previous parameters of 3960 horizontal pixels for the source and 1980 horizontal pixels for the display, a factor of [½]-n may provide a pixel array with 1980-n horizontal pixels that may be orbited. The scaling unit 305 may be bypassed if the scaling unit 303 can achieve the proper scaling alone.

A double data rate (DDR) clock crossing unit 304 may implemented as a memory unit (e.g., synchronous dynamic random access memory (SDRAM)) for shifting the crossing point between the input clock domain and the display clock domain. The DDR clock crossing unit 304 may decouple the video stream between both clock domains, by buffering the video data when scaling unit 305 requests a sample, and maintaining a balance of data flow. The data transfer from the input clock domain to the panel clock domain may then occur within a valid range.

A scaling unit 305 may include an upscaling unit and/or a downscaling unit configured to scale the number of data samples for a proper format in the display clock domain. The scaling unit 305 may be configured to perform at least one of an upscaling of horizontal pixels, an upscaling of vertical pixels, a downscaling of horizontal pixels or a downscaling of vertical pixels. For example, if the video source is 1280 horizontal pixels and the display is 1980 horizontal pixels, the scaling unit 305 may upscale the data samples as appropriate. The scaling factor may also include the value n to account for reserved pixels in the horizontal row in regions 106, 107 as shown in FIG. 1. The scaling unit 303 may be bypassed if the scaling unit 305 can achieve the proper scaling alone.

Alternatively, both scaling units 303 and 305 may work in tandem to achieve the proper display array of pixels. The scaling units 303 and 305 may work alone or in combination to achieve a final scaling appropriate for the orbiting and/or a zoom function. For example, scaling units 303 and 305 may perform cross scaling such as horizontal upscale and vertical downscale, and vice-versa.

A video-out processing unit 306 includes circuitry and/or software modules configured to perform functions including region of interest analysis, text generation, wobble, waveform monitor, and/or virtual CRT (i.e., CRT behavior emulation). The video-out processing unit 306 generates and sends the video out signal to the display 320.

A shift processor 307 may execute the shifting of the pixel array as described above for steps 206, 208 and 210. The shift processor 307 may set the number of pixels that the pixel array is to shift and whether the shift is in a horizontal direction, a vertical direction, or both. The shift processor 307 may also determine how frequently the shifts occur, whether constant or variable, and initiate each shift accordingly. The shift processor 307 may apply a Gaussian distribution to the series of shifts, which may produce an orbiting pattern about a reference pixel.

A control unit 301, such as a microprocessor, may interface with the video-in processing unit 302, the scaling units 303, 305 the clock crossing unit 304, the video-out processing unit 306, and the shift processor 307 to control the sequence of operations and to control the input/output flow of data. A memory 311 may be used in conjunction with the control unit 301 for storing the information pertaining to the pixels during the scaling and shifting process, such as reduced size of the visual display, current array position, previous shift positions, number of pixels n or m to shift the array, and shift frequency for example. In one embodiment, the memory 311 may store the current array position prior to the display 320 being turned off. Upon restoring power to the display 320, the memory 311 may recall the stored position of the array, and the image on the display 320 may be presented based on the stored array position.

Figure 4:
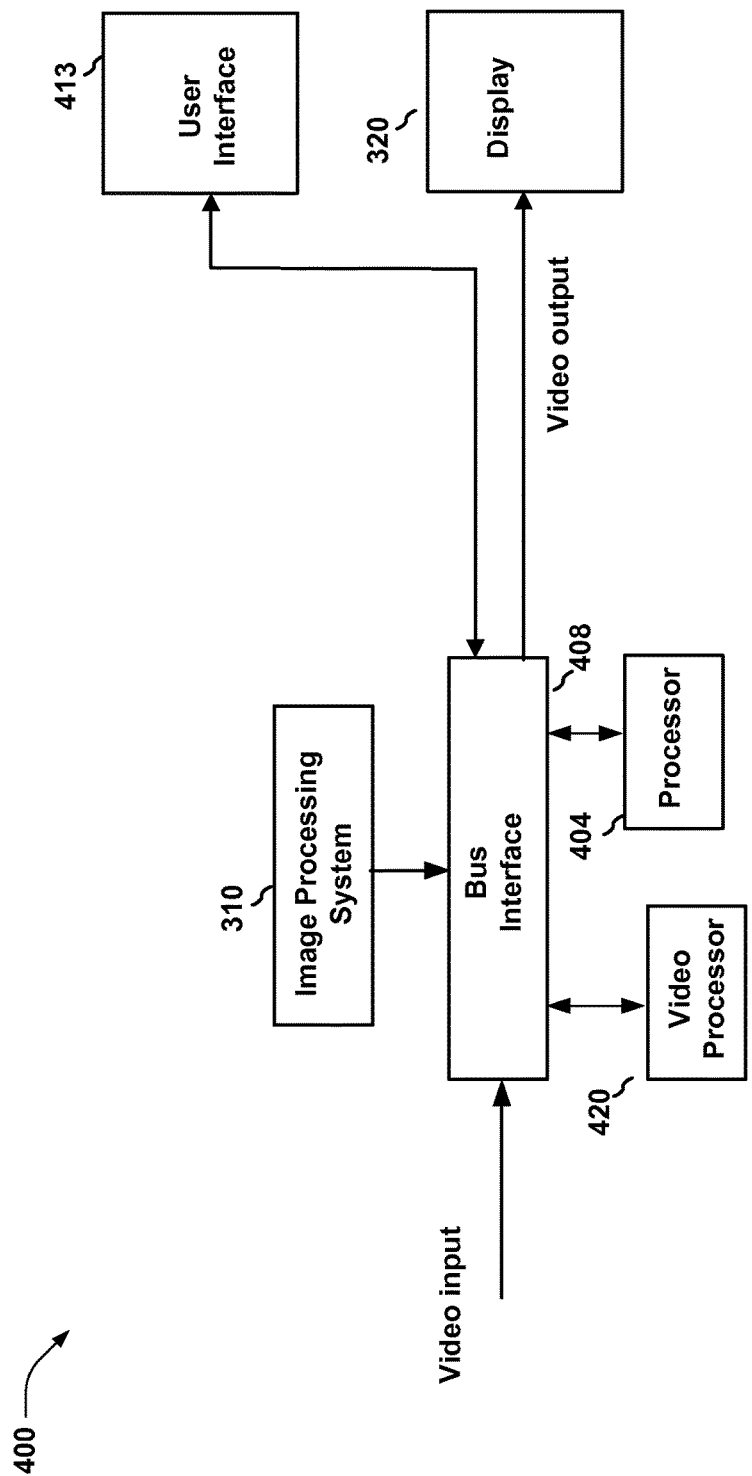
FIG. 4 is a diagram illustrating an exemplary hardware implementation for a display apparatus configured to perform scaling and shifting of a pixel array.

FIG. 4 is a conceptual diagram illustrating an example of a hardware implementation of the image processing system 310 within a video display apparatus 400. In this example, video display apparatus 400 may include the display 320, a user interface 413, and a bus architecture for the video input, represented generally by the bus interface 408. The bus interface 408 may include any number of interconnecting buses and bridges depending on the specific application of the video display apparatus 400 and the overall design constraints. The bus interface 408 may link together various circuits including one or more processors, represented generally by processor 404, video processor 420, and image processing system 310. The processor 404 may be responsible for managing the bus 402 and general processing. The video processor 420 may include multiple processors, such as a signal processor or other specialized processor. The video processor 420 may be configured to operate on pixels in the sequence of images to produce a signal representative of one or more images present in the video input. For example, the video processor 420 may perform gamma correction, color correction, sharpness, white balance, and other video processing functions. The bus interface 408 may also link various other circuits such as timing sources, peripherals, voltage regulators, and power management circuits, which are well known in the art, and therefore, will not be described any further.

In one example, the display apparatus 400 may be incorporated in a camera, such that the video input is a "raw" image signal provided directly to video processor 420, which may process pixel information in a sequence of images to produce a standardized video output representative of a sequence of frames. In another example, the display apparatus 400 may be a high definition display device, such as a computer display, a television, or other display. The video input information may comprise a compressed video stream and metadata including background information, foreground objects, motion vectors, virtual lines, object counting, object tracking and other metadata. Depending upon the nature of the apparatus 400, a user interface 413, including one or more of a keypad, speaker, microphone, or joystick, may be provided.

Figure 5:
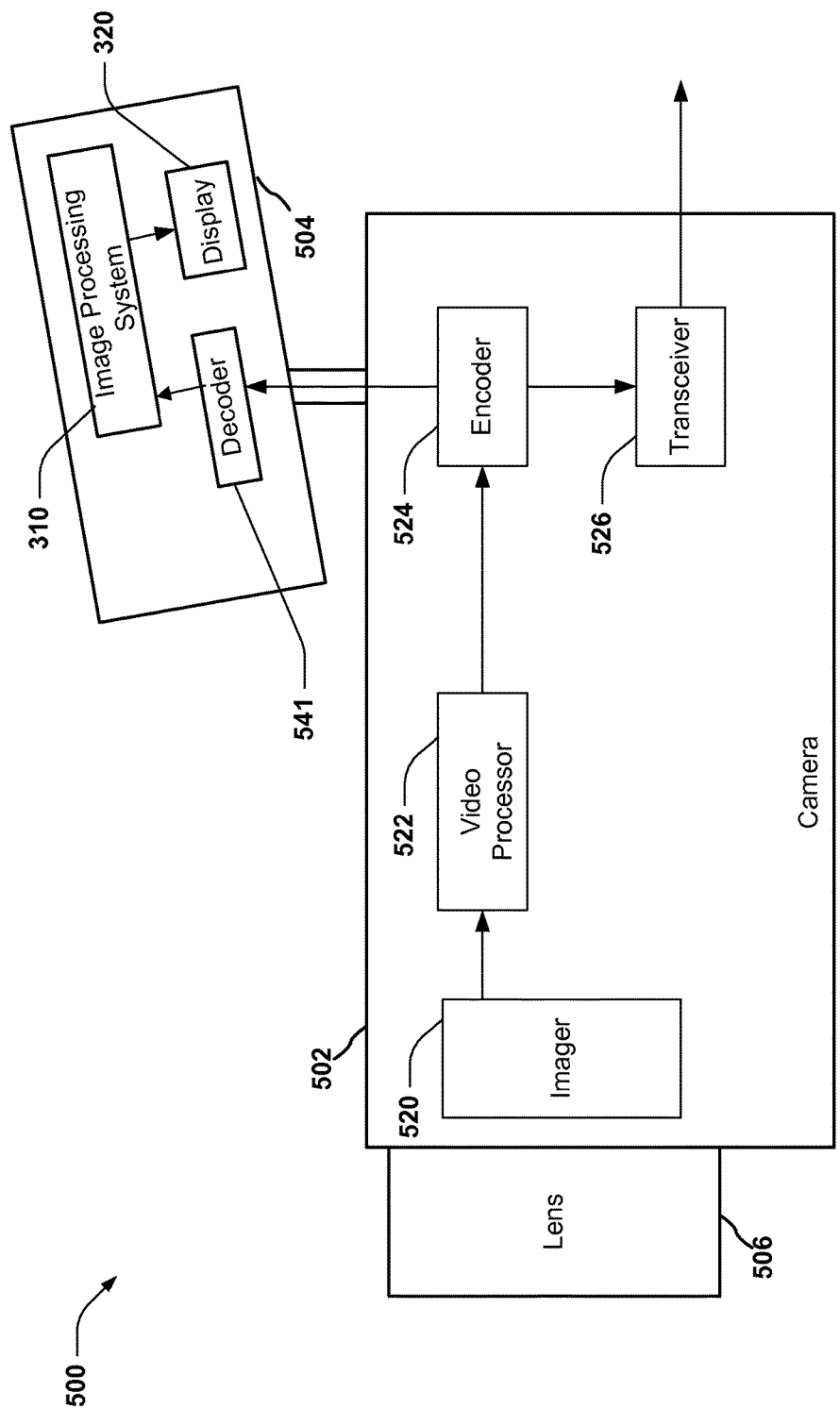
FIG. 5 is a block diagram illustrating an exemplary camera system having a viewfinder configured to perform scaling and shifting of a pixel array.

FIG. 5 is a simplified block diagram illustrating an exemplary camera system 500 that implements the image processing system 310 in a viewfinder 504. Camera system 500 may comprise a camera 502, the viewfinder 504, and a lens system 506. Camera 502 may include an imager 520, which may comprise one or more CCD or CMOS imaging devices to convert photons to electrical video signals. Camera 502 may comprise one or more video processors 522 that receive a sequence of images and produce a video output having a desired frame rate, aspect ratio, etc. An encoder 524 may receive a raw video output from video processor 522 and produce a formatted video signal encoded according to a particular specification (e.g., Serial Digital Interface (SDI), H.264/MPEG-4 Advanced Video Coding, or High Definition Multimedia Interface (HDMI)). The signal from encoder 524 may be output for transmission to a video production system and/or over a network using transceiver 526. Encoder 524 may also provide an encoded or raw video feed to viewfinder 504.

View finder 504 may include a decoder 541 which receives encoded video or raw video from encoder 524 and provides image data for the display 542. The image processing system 310 receives the video signal from decoder 541 and may perform the pixel array shifting process described above. In one example, the display 542 may include an organic light-emitting diode (OLED) at each pixel, whereby a light-emitting diode (LED) is coated with an emissive electroluminescent layer formed from an organic compound which emits light in response to an electric current. These and other devices may be used to generate images on the display 542.

Lens system 506 may be controlled to provide a desired optical configuration of lenses, which configuration may specify, for example, a depth of field setting, a numerical aperture, and a focal length.

By way of example and without limitation, the aspects of the present disclosure are presented with reference to systems and methods used to configure various components of a video production system that may be used for production of television programming or at sports events. The various concepts presented throughout this disclosure may be implemented across a broad variety of imaging applications, including systems that capture and process video and/or still images, video conferencing systems and so on.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A viewfinder apparatus, comprising:
    a display comprising an array of horizontal pixels and vertical pixels; and
    an image processing system configured to:
        present an image and an overlay on the display as a visible display array having a smaller size than the array; and
        shift the visible display array by at least one pixel, wherein the presented image and overlay are shifted by the at least one pixel.

2. The apparatus of claim 1, wherein the image processing system further comprises a shift processor configured to set a maximum horizontal shift of n pixels and a maximum vertical shift of m pixels, wherein the shift of at least one pixel comprises at least one of a horizontal shift of N pixels in the range $1<=N<=n$, or a vertical shift of M pixels in the range $1<=M<=m$.

3. The apparatus of claim 1, wherein the image processing system further comprises a shift processor configured to set a shift frequency and perform subsequent shifts of the visible display array at intervals according to the shift frequency.

4. The apparatus of claim 3, wherein the shift processor is further configured to apply a Gaussian filter to distribute the visible display array.

5. The apparatus of claim 1, wherein the image processing system further comprises a scaling unit configured to scale an input video image size to fit the visible display array.

6. The apparatus of claim 5, wherein the scaling unit comprises at least one upscaling unit and at least one downscaling unit configured to perform at least two of an upscaling of horizontal pixels, an upscaling of vertical pixels, a downscaling of horizontal pixels or a downscaling of vertical pixels.

7. The apparatus of claim 5, wherein the image processing system comprises a clock crossing unit to buffer a video input signal of a first clock domain for a scaling performed in a second clock domain.

8. The apparatus of claim 1, further comprising a user interface.

9. The apparatus of claim 1, further comprising a memory configured to store a current position of the shifted visible display array, wherein upon deenergizing the display and restoring power to the display, the position is recalled from the memory, and the visible display array is presented based on the stored position.

10. The apparatus of claim 1, wherein the overlay comprises a center cross-mark.

11. The apparatus of claim 10, wherein the center cross-mark forms a guide for a user with reference to a center of view of the display.

12. A camera, comprising:
    an imager configured to convert photons to an electrical image signal; and
    a viewfinder comprising:
        a display comprising an array of horizontal pixels and vertical pixels; and
        an image processing system configured to:
            present an image and an overlay on the display based on the electrical image signal as a visible display array having a smaller size than the array; and
            shift the visible display array by at least one pixel, wherein the presented image and overlay are shifted by the at least one pixel.

13. The camera of claim 12, wherein the overlay comprises a center cross-mark.

14. The camera of claim 13, wherein the center cross-mark forms a guide for a user with reference to a center of view of the camera.

* * * * *